United States Patent Office 3,795,676
Patented Mar. 5, 1974

3,795,676
7-SUBSTITUTED PLEIADENES AND 8-SUBSTITUTED DIBENZOHEPTALENES
William J. Houlihan, Mountain Lakes, and Jeffrey Nadelson, Lake Parsippany, N.J., assignors to Sandoz-Wander, Inc., Hanover, N.J.
No Drawing. Original application Oct. 1, 1970, Ser. No. 77,373, now Patent No. 3,719,280. Divided and this application Nov. 14, 1972, Ser. No. 306,442
Int. Cl. C07d 29/12
U.S. Cl. 260—293.62                     5 Claims

ABSTRACT OF THE DISCLOSURE

Pleiadenes substituted at the 7-position, e.g. 1,2,3,7,-tetrahydro-7-(1-methyl-4-piperidyl)pleiadene and 1,2,3,7,12,12a-hexahydro-7-(1 - methyl-4-piperidyl)pleiaden-7-ol, and dibenzoheptalenes substituted at the 8-position, e.g. 1,2,3,4-tetrahydro-8 - (1-methyl-4-piperidyl)-8H-dibenzo[b,ef]heptalene, prepared from a corresponding ketone and Grignard reagent, are useful as central nervous system stimulants.

This is a divisional application of copending application Ser. No. 77,373 filed Oct. 1, 1970, now U.S. Pat. No. 3,719,280.

This invention relates to pleiadenes and dibenzoheptalenes substituted with a methyl piperidyl moiety. Moreover, the invention concerns intermediates and pharmaceutically acceptable salts of said compounds, and processes therefor.

The compounds of this invention may be represented by the following structural formula:

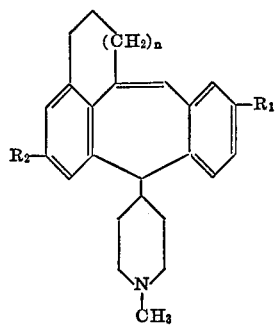

wherein
$n$ represents 1 or 2;
$R_1$ represents H, halo having an atomic weight of 19–36, or trifluoromethyl; and
$R_2$ represents H, halo having an atomic weight of 19–36, trifluoromethyl, straight chain lower alkyl, e.g. straight chain alkyl of 1–4 carbon atoms, e.g. methyl, ethyl and butyl, or straight chain lower alkoxy, i.e. straight chain alkoxy having 1–4 carbon atoms, e.g. methoxy, ethoxy or propoxy.

The process for preparing Compounds I may be represented by the following reaction scheme:

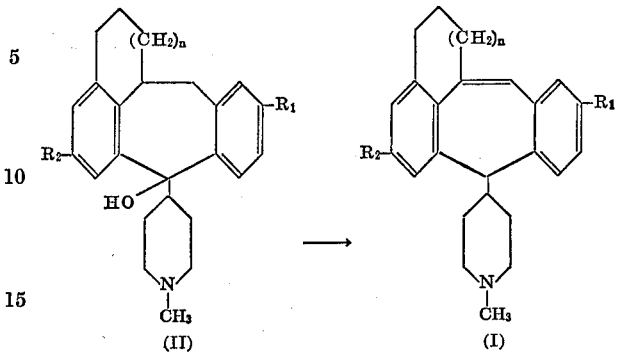

where
$R_1$, $R_2$ and $n$ are as previously defined.

This process may be carried out by treating a compound of Formula II in a manner similar to those described in the prior art for preparing dibenzocyloheptene type compounds. For instance, this process may be effected by heating the Compound II with alcoholic hydrogen chloride or other strongly acidic media such as phosphorous oxychloride, sulfuric acid, acetic acid, and the like. The process is preferably conducted in a suitable inert organic solvent such as chloroform, methylene chloride, and the like. The reaction temperature is about 50°–150° C., preferably about 100° C.

The Compounds II are prepared according to the following reaction scheme:

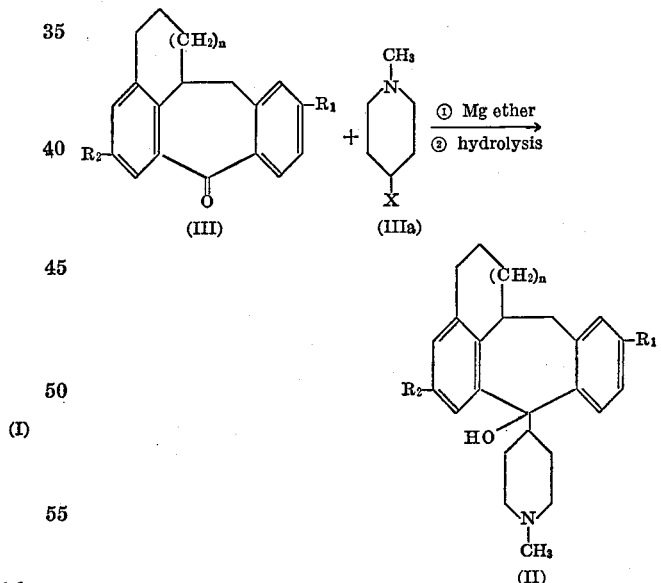

where $R_1$, $R_2$, and $n$ are as previously defined and X is halo of atomic weight 35–80.

This process is carried out by condensing the ketone (III) with a Grignard reagent prepared from known Compound IIIa and the resulting Grignard adduct is then hydrolyzed to form the corresponding Compound II. The preparation of the Grignard reagent, the condensation with Compound III and the subsequent hydrolysis of the resulting Grignard adduct are all carried out in a manner similar to that previously described in the prior art for the preparation of dibenzocycloheptene type compounds. Accordingly, the Grignard reagent may be prepared by the reaction of an appropriate metal, e.g. magnesium, with an ethereal solution of Compound IIIa. Condensation of the Grignard reagent with the ketone (III) may be effected at about —20° C. to 20° C. in an inert solvent, e.g. absolute diethyl ether or tetrahydrofuran. After condensation, the Grignard adduct may be hydrolytically decomposed at about 0° C. under practically neutral conditions, e.g., by hydrolysis in aqueous amonium chloride solution.

The compounds of Formula III are prepared as indicated in the following reaction scheme:

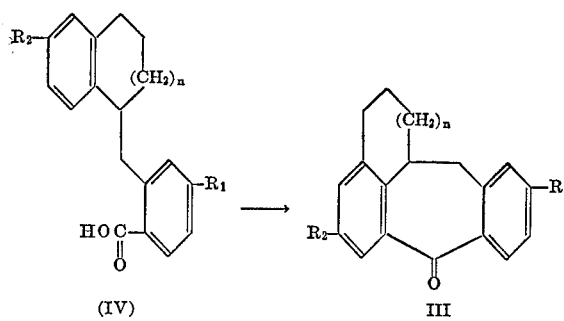

(IV)    III where $R_1$, $R_2$ and $n$ are as defined above.

Compounds III may be prepared by treating the Compounds IV with strong mineral acid, e.g. sulfuric acid or polyphosphoric acid, preferably polyphosphoric acid, at about 70° to about 120° C., preferably 80° to 100° C., for about 1–5 hours. Although solvent is not considered necessary, solvents which may be used include aromatic or aliphatic hydrocarbons, e.g., benzene, toluene, pentene and the like. The temperatures, solvents and time of reaction are not critical. The product (III) may be recovered by conventional techniques, such as evaporation and filtration.

Alternatively, Compounds III may be prepared from either the corresponding lower alkyl esters, preferably the methyl or ethyl ester, or the corresponding acid halides, preferably the acid chloride or bromide, of the compounds of Formula IV. The lower alkyl esters, themselves preparable from the acids (IV) by known techniques, e.g., conventional Fischer esterification, are converted into Compounds III in the same manner as described above with reference to the acid starting materials. On the other hand, the acid halides of Compounds IV are converted into Compounds III first by treating said acid halides with a Friedel-Crafts type catalyst, preferably stannic chloride or aluminum trichloride, in inert ether or hydrocarbon solvent such as aromatic hydrocarbon, e.g., benzene, toluene or xylene, or aliphatic hydrocarbon such as pentane or hexane, or ethyl ether, tetrahydrofuran and the like, at a temperature of about —10° C. to about 20° C., preferably —5° C. to about 10° C., for about 1 to 5 hours. The resulting reaction product is then converted into Compounds III by known hydrolytic techniques, such as by treatment with aqueous acid such as hydrochloric acid for about 1–24 hours conveniently at reflux temperature to room temperature. Neither time, temperature nor particular solvent used is critical in obtaining the Compounds III. The acid halides used in the above described process may be obtained from the corresponding acid (IV) by standard techniques, such as treatment of the acid with halogenating agent, e.g., thionyl chloride or phosphorous pentachloride, conveniently in inert solvent such as inert ether or hydrocarbon solvent such as those utilized above in the treatment of the acid halides with the Friedel-Crafts type catalyst, at about 50°–150° C., preferably 70°–90° C., for about 1–5 hours.

The Compounds IV are obtainable according to the following multi-step procedure.

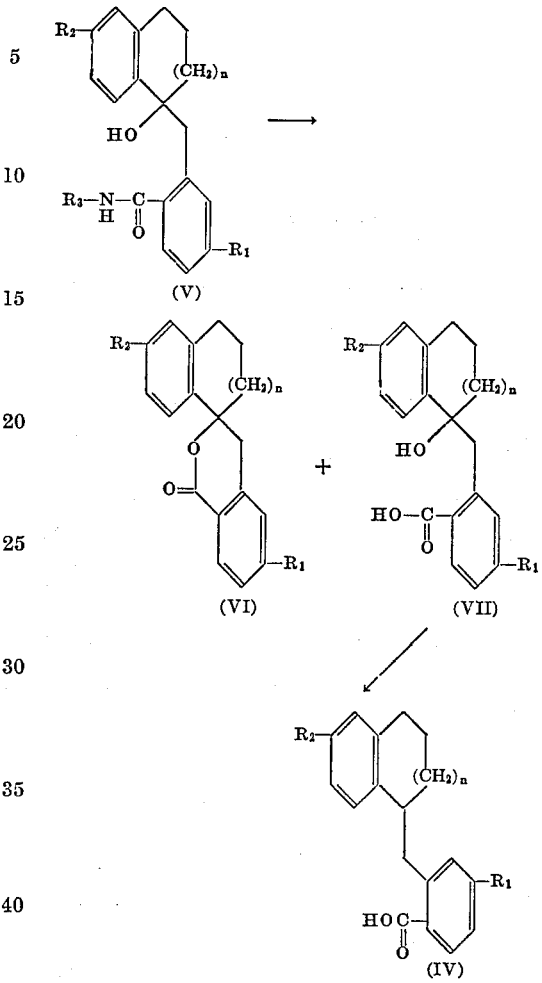

where $R_1$, $R_2$ and $n$ are as previously defined and $R_3$ represents lower alkyl i.e., alkyl of 1–4 carbon atoms, e.g. methyl or ethyl.

Compounds V provide Compounds VI and VII when treated first with strong base such as alkali or alkaline earth metal hydroxides or hydrides, e.g., sodium hydroxide, potassium hydroxide, calcium hydroxide or sodium hydride, in aqueous or alcoholic solvents, such as lower alkanols, e.g., methanol, ethanol, isopropanol, and the like, or mixtures thereof, at about 60° to 180° C., preferably 70°–100° C., for about 12–48 hours. The resulting product may then be treated in the above solvent with strong mineral acid such as a hydrohalic acid, e.g., hydrochloric acid or hydrobromic acid, or sulfuric acid, phosphoric acid and the like, at a temperature of from about —10° to 15° C., preferably —5° to 10° C. The time and temperature of the reaction and the particular solvent utilized is not critical. The resulting Compounds VI and VII may be separated using conventional techniques.

Compounds VI and VII, together or separately, may be converted to the acids of Formula IV by reduction. Accordingly, Compounds IV may be obtained by treating Compounds VI or VII with hydrogen gas in alcoholic solvents, such as lower alkanols, e.g. methanol, ethanol or propanol, in the presence of strong mineral acid such as hydrohalic acid, e.g. hydrochloric acid or hydrobromic acid, or sulfuric acid and the like, over palladium catalyst, preferably 5% to 30% palladium on carbon, conveniently 10% Pd/C, at a temperature of 20°–80° C., preferably 25°–35° C., and a pressure of about 35–100 pounds per square inch for about 2–24 hours. The pressure, temperature, time of reaction and particular solvent utilized are not critical. The products (IV) may be recovered by conventional techniques, such as filtration and concentration.

Compounds V may be prepared according to the following reaction scheme:

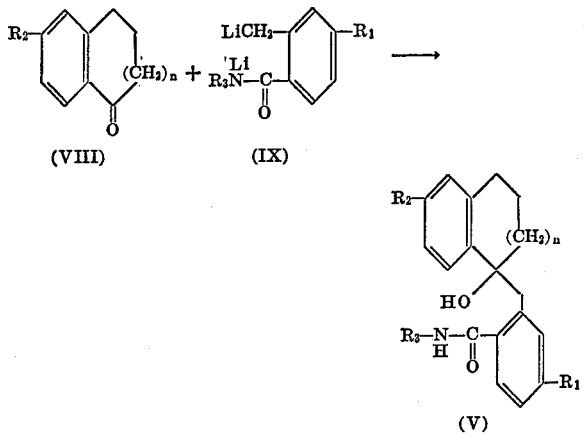

where $R_1$, $R_2$, $R_3$ and $n$ are as previously defined.

Compounds V may be prepared by condensing a Compound VIII with a Compound IX in inert atmosphere, e.g. nitrogen gas, and in an inert solvent such as ethers, e.g. diethyl ether or tetrahydrofuran, or hydrocarbons or aromatic hydrocarbons such as hexane, heptane, benzene, toluene and the like and subjecting the reaction mixture to hydrolysis, preferably with water at about —10° to 10° C. The condensation may be carried out at a temperature of from about —60° to —40° C., preferably about —50° C. for about 1 to 3 hours. The exact time and temperature of reaction and the particular solvent used is not critical in obtaining the product (V). Said product may be recovered by conventional techniques, e.g. filtration.

It will be understood that certain of the compounds of Formulas I, II, III, IV, V, VI, and VII exist in racemic form or in the form of optically active isomers. The separation and recovery of the respective isomers may be readily accomplished employing conventional techniques and such isomers are included within the scope of the invention.

Certain of the Compounds VIII and IX are known and may be prepared according to methods disclosed in the literature. Those compounds of Formulas VIII and IX not known may be prepared by analogous compounds from known materials.

The compounds of Formulas I and II are useful because they possess pharmacological activity in animals. More particularly, the compounds possess anticonvulsant activity as indicated by their activity in mice given 25.6 mg./kg. of body weight of active material and tested using the method basically as described by Orloff et al. (Proc. Soc. Exp. Biol. 70:254, 1949) respecting chemically induced seizures.

For such use, the Compound I or II may be combined with a pharmaceutically acceptable carrier or adjuvant, and may be administered orally in such forms as tablets, capsules, elixirs, suspensions and the like, or parenterally in the form of an injectable solution or suspension. The dosage will vary depending upon the mode of administration utilized and the particular compound employed.

These compounds of Formulas I and II may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the maleate, fumarate, tartrate, citrate, succinate, benzoate, acetate, p-toluenesulfonate, benzenesulfonate and the like.

In general, satisfactory results for anticonvulsant activity are obtained when the compounds are administered at a daily dosage of from about 5–200 milligrams per kilogram of animal body weight. This daily dosage is preferably given in divided doses, e.g., 2 to 4 times a day, or in sustained release form. For most large animals, the total daily dosage is from about 350 to 2000 milligrams and dosage forms suitable for internal administration comprise from about 80 to 500 milligrams of the compound in admixture with a solid or liquid pharmaceutical carrier or diluent.

As noted above, the compounds of Formula I exist as optical isomers. In some cases greater pharmacological activity or other beneficial attribute may be found for a particular isomer and in such instances administration of such isomer may be preferred.

A representative formulation suitable for oral administration is a tablet prepared by standard tabletting techniques which contains the following:

| Ingredient: | Parts by weight |
|---|---|
| 1,2,3,7-tetrahydro-7-[1 - methyl - 4 - piperidyl] pleiadene | 10 |
| Tragacanth | 2 |
| Lactose | 79.5 |
| Corn starch | 5 |
| Talcum | 3 |
| Magnesium stearate | 0.5 |

EXAMPLE 1

α-(1,2,3,4-tetrahydro-1-hydroxy-1-naphthyl)-N-methyl-o-toluamide

To a flask equipped with a stirrer, dropping funnel, condenser and gas inlet tube maintained under a nitrogen atmosphere, there is added at room temperature 40.0 g. (0.28 mole) of o-methyl-N-methyl-benzamide and 250 ml. of anhydrous tetrahydrofuran. The reaction flask is immersed in an ice bath and cooled to an internal temperature of 5° C. Stirring is initiated and 380 ml. 1.6 M n-butyllithium (0.616 mole) in hexane is added dropwise in ca. 1 hour while maintaining the temperature below 8° C. The resulting red dilithio salt is stirred at 5° C. for one additional hour and then the reaction flask is immersed in a Dry-Ice acetone bath and cooled to an internal temperature of —60° C. To the cold reaction mixture a solution of 41.0 g. (0.28 mole) of 3,4-dihydro-1(2H)-naphthalenone in 140 ml. anhydrous tetrahydrofuran is added dropwise in ca. 45 minutes maintaining the temperature between —60° and —50° C. The resulting reaction mixture is stirred at —60° C. for 1 hour, allowed to warm to 0° C. ca. 1 hour and then treated with 200 ml. of water while maintaining the temperature below 10° C. The resulting solid is washed thoroughly with water and dried to give α-(1,2,3,4 - tetrahydro-1-hydroxy-1-naphthyl)-N-methyl-o-toluamide; M.P. 204–206° C.

When the above process is carried out and in place of 3,4-dihydro-1(2H)-naphthalenone there is used (a) 3,4-dihydro-6-methyl-1(2H)naphthalenone,
(b) 6-chloro-3,4-dihydro-1(2H)naphthalenone,
(c) 3,4-dihydro-6-methoxy-1(2H)naphthalenone,
(d) 6,7,8,9-tetrahydro-2-trifluoromethyl-5-benzocycloheptenone, or
(e) 6,7,8,9-tetrahydro-5-benzocycloheptenone there is obtained (a) α-(1,2,3,4-tetrahydro-1-hydroxy-6-methyl-1-naphthyl)-N-methyl-o-toluamide,
(b) α-(6-chloro-1,2,3,4-tetrahydro-1-hydroxy-1-naphthyl)-N-methyl-o-toluamide,
(c) α-(1,2,3,4-tetrahydro-1-hydroxy-6-methoxy-1-naphthyl)-N-methyl-o-toluamide, (d) α-(6,7,8,9-tetrahydro-5-hydroxy-2-trifluoromethyl-5(5H)-benzocycloheptenyl)-N-methyl-o-toluamide, or (e) α-(6,7,8,9-tetrahydro-5-hydroxy-5(5H)-benzocycloheptenyl)-N-methyl-o-toluamide, respectively.

When the above detailed process is carried out and in place of o-methyl-N-methyl benzamide there is used (f) 2-methyl-4-trifluoromethyl-N-methyl benzamide, or
(g) 4-chloro-2-methyl-N-ethyl benzamide, there is obtained (f) α-(1,2,3,4-tetrahydro-1-hydroxy-1-naphthyl)4-trifluoromethyl-N-methyl-o-toluamide, or
(g) 4-chloro-α(1,2,3,4-tetrahydro-1-hydroxy-1-naphthyl-N-ethyl-o-toluamide, respectively.

EXAMPLE 2

α-(1,2,3,4-tetrahydro-1-hydroxy-1-naphthyl)-o-toluic acid and 3',4'-dihydrospiro[isochroman-3,1'(2'H)naphthalen]-1-one To a flask equipped with a stirrer, condenser and gas inlet tube maintained under a nitrogen atmosphere, there is added at room temperature 1.7 liters of ethanol, 166 g. of potassium hydroxide pellets (2.96 moles) followed by portion-wise addition of 166.7 g. (0.57 mole) of α-(1,2,3,4-tetrahydro-1-hydroxy-1-naphthyl)-N-methyl-o-toluamide. The reaction mixture is then heated at reflux for 48 hours and cooled to an internal temperature of 0° C. Concentrated hydrochloric acid is added, maintaining the temperature below 20° C. until pH 2 is obtained. The resulting precipitate is filtered and washed thoroughly with ethanol, then with water, and dried to provide α-(1,2,3,4-tetrahydro-1-hydroxy-1-naphthyl)-o-toluic acid, M.P. 132–133° C. The ethanolic filtrates are concentrated in vacuo and the residue dissolved in methylenechloride and washed twice with 200 ml. of water, dried over magnesium sulfate, filtered and evaporated to provide crude 3',4'-dihydrospiro[isochroman-3,1'(2'H)naphthalen]-1-one.

When the above process is carried out and in place of α-1,2,3,4-tetrahydro-1-hydroxy-1-naphthyl-N-methyl-o-toluamide there is used (a) α-(1,2,3,4-tetrahydro-1-hydroxy-6-methyl-1-naphthyl)-N-methyl-o-toluamide,
(b) α-(6-chloro-1,2,3,4-tetrahydro-1-hydroxy-1-naphthyl)-N-methyl-o-toluamide,
(c) α-(1,2,3,4-tetrahydro-1-hydroxy-6-methoxy-1-naphthyl)-N-methyl-o-toluamide,
(d) α-(6,7,8,9-tetrahydro-5-hydroxy-2-trifluoromethyl-5(5H)-benzocycloheptenyl)-N-methyl-o-toluamide,
(e) α-(6,7,8,9-tetrahydro-5-hydroxy-5(5H)-benzocycloheptenyl)-N-methyl-o-toluamide,
(f) α-(1,2,3,4-tetrahydro-1-hydroxy-1-naphthyl)-4-trifluoromethyl-N-methyl-o-toluamide, or
(g) 4-chloro-α(1,2,3,4-tetrahydro-1-hydroxy-1-naphthyl-N-ethyl-o-toluamide, there is obtained (a) α-(1,2,3,4-tetrahydro-1-hydroxy-6-methyl-1-naphthyl)-o-toluic acid and 3',4'-dihydro-6'-methylspiro[isochroman-3,1'(2'H)naphthalen]-1-one,
(b) α-(6-chloro-1,2,3,4-tetrahydro-1-hydroxy-1-naphthyl)-o-toluic acid and 6'-chloro-3',4'-dihydrospiro[isochroman-3,1'(2'H)naphthalen]-1-one,
(c) α-(1,2,3,4-tetrahydro-1-hydroxy-6-methoxy-1-naphthyl)-o-toluic acid and 3',4'-dihydro-6'-methoxyspiro[isochroman-3,1'(2'H)naphthalen]-1-one,
(d) α-(6,7,8,9-tetrahydro-5-hydroxy-2-trifluoromethyl-5(5H)-benzocycloheptenyl)-o-toluic acid and 6,7,8,9-tetrahydro-2-trifluoromethylspiro[benzocycloheptene-5,3'-isochroman]-1'-one,
(e) α-(6,7,8,9-tetrahydro-5-hydroxy-5(5H)-benzocycloheptenyl)-o-toluic acid and 6,7,8,9-tetrahydrospiro[benzocycloheptene-5,3'-isochroman]-1'-one,
(f) α-(1,2,3,4-tetrahydro-1-hydroxy-1-naphthyl-4-trifluoromethyl-o-toluic acid and 3',4'-dihydro-6-trifluoromethylspiro[isochroman-3,1'(2'H)naphthalen]-1-one, or
(g) 4-chloro-α(1,2,3,4-tetrahydro-1-hydroxy-naphthyl)-o-toluic acid and 6-chloro-3',4'-dihydrospiro[isochroman-3,1'(2H)naphthalen]-1-one, respectively.

EXAMPLE 3

α-(1,2,3,4-tetrahydro-1-naphthyl)-o-toluic acid

A mixture of 30 g. (0.106 mole) of α-(1,2,3,4-tetrahydro-1-hydroxy-1-naphthyl)-o-toluic acid and 30 g. (0.114 mole) 3',4'-dihydrospiro[isochroman-3,1'-(2'H)naphthalen]-1-one is dissolved in 1 liter of ethanol containing 18.1 g. of 10% palladium on carbon (Pd/C) and 9.5 ml. of concentrated hydrochloric acid. The resulting mixture is hydrogenated at 55 p.s.i. and 25° C. on a Parr apparatus until no further hydrogen is absorbed. The mixture is filtered to remove the catalyst and evaporated in vacuo. The residue is dissolved in methylene chloride, washed once with 200 ml. of water, dried over magnesium sulfate, filtered and evaporated to yield α-(1,2,3,4-tetrahydro-1-naphthyl)-o-toluic acid; M.P. 103–107° C.

When the above process is carried out and each of the mixtures of two products set out in Example 2, parts (a) through (g) is used in place of α-(1,2,3,4-tetrahydro-1-hydroxy-1-naphthyl)-o-toluic acid and 3',4'-dihydrospiro[isochroman-3,1'(2'H) naphthalen]-1-one, there is obtained (a) α-(1,2,3,4-tetrahydro-6-methyl-1-naphthyl)-o-toluic acid,
(b) α-(6-chloro-1,2,3,4-tetrahydro-1-naphthyl)-o-toluic acid,
(c) α-(1,2,3,4-tetrahydro-6-methoxy-1-napthyl)-o-toluic acid,
(d) α-(6,7,8,9-tetrahydro-2-trifluoromethyl-5(5H)-benzocycloheptenyl)-o-toluic acid,
(e) α-(6,7,8,9-tetrahydro-5(5H)benzocycloheptenyl)-o-toluic acid,
(f) α-(1,2,3,4-tetrahydro-1-naphthyl)-4-trifluoromethyl-o-toluic acid, or
(g) 4-chloro-α-(1,2,3,4-tetrahydro-1-naphthyl)-o-toluic acid, respectively.

EXAMPLE 4A 1,2,3,12a-tetrahydro-7(12H)pleiadenone

To a flask equipped with a stirrer, dropping funnel, condenser and gas inlet tube maintained under a nitrogen atmosphere there is added at room temperature 10.6 g. (0.04 mole) of α-(1,2,3,4-tetrahydro-1-naphthyl)-o-toluic acid and 100 ml. of anhydrous benzene. Stirring is initiated and 8.3 g. (0.04 mole) phosphorous pentachloride is added portionwise maintaining the temperature below 30° C. The resulting mixture is then heated at reflux for 1 hour and then cooled to an internal temperature of +5° C. To the cooled reaction mixture a solution of 10.4 ml. (0.088 mole) of stannic chloride in 100 ml. benzene is added dropwise while maintaining the temperature below 8° C. The reaction mixture is stirred 2 hours at 8° C. and then 20 g. of ice and 25 ml. of concentrated hydrochloric acid is added, the resulting mixture refluxed for ½ hour and stirred for 18 hours at room temperature. The layers are separated and the aqueous phase is washed once with 100 ml. benzene. The combined organic phases are washed with 100 ml. of water, 50 ml. of 10% sodium carbonate, 50 ml. of water and 50 ml. of saturated sodium chloride solution. They are then dried over magnesium sulfate, filtered and evaporated to give 1,2,3,12a-tetrahydro-7(12H)-pleiadenone.

When the process is carried out (a) α-(1,2,3,4-tetrahydro-6-methyl-1-naphthyl)-o-toluic acid,
(b) α-(6-chloro-1,2,3,4-tetrahydro-1-naphthyl)-o-toluic acid,
(c) α-(1,2,3,4-tetrahydro-6-methoxy-1-naphthyl)-o-toluic acid,
(d) α-(6,7,8,9-tetrahydro-2-trifluoromethyl-5(5H)-benzocycloheptenyl)-o-toluic acid,
(e) α-(6,7,8,9-tetrahydro-5(5H)-benzocycloheptenyl)-o-toluic acid,
(f) α-(1,2,3,4-tetrahydro-1-naphthyl)-4-trifluoromethyl-o-toluic acid, or
(g) 4-chloro-α-(1,2,3,4-tetrahydro-1-naphthyl)-o-toluic acid, is used in place of α-(1,2,3,4-tetrahydro-1-naphthyl)-o-toluic acid, there is obtained.

(a) 1,2,3,12a-tetrahydro-5-methyl-7(12H)-pleiadenone,
(b) 5-chloro-1,2,3,12a-tetrahydro-7(12H)-pleiadenone,
(c) 1,2,3,12a-tetrahydro-5-methoxy-7(12H)-pleiadenone,
(d) 1,2,3,4,13,13a-hexahydro-6-trifluoromethyl-8H-dibenzo[b,ef]heptalen-8-one,
(e) 1,2,3,4,13,13a-hexahydro-8H-dibenzo[b,ef]heptalen-8-one,
(f) 1,2,3,12a-tetrahydro-10-trifluoromethyl-7(12H)-pleiadenone, or
(g) 10-chloro-1,2,3,12a-tetrahydro-7(12H)-pleiadenone, respectively.

EXAMPLE 4B 1,2,3,12a-tetrahydro-7(12H)-pleiadenone

To a flask equipped with a stirrer, condenser and gas inlet tube maintained under a nitrogen atmosphere, there is added 10.6 g. (0.04 mole) of α-(1,2,3,4-tetrahydro-1-naphthyl)-o-toluic acid and 50 g. of polyphosphoric acid. The reaction mixture is stirred 2 hours at 90° C. and poured with stirring onto 100 g. of crushed ice and extracted with ethyl ether. The ether extract is dried over magnesium sulfate and evaporated to give 1,2,3,12a-tetrahydro-7(12H)-pleiadenone.

When the above process is carried out and (a) α-(1,2,3,4-tetrahydro-6-methyl-1-naphthyl)-o-toluic acid,
(b) α-(6-chloro-1,2,3,4-tetrahydro-1-naphthyl)-o-toluic acid,
(c) α-(1,2,3,4-tetrahydro-6-methoxy-1-naphthyl)-o-toluic acid,
(d) α-(6,7,8,9-tetrahydro-2-trifluoromethyl-5(5H)-benzocycloheptenyl)-o-toluic acid,
(e) α-(6,7,8,9-tetrahydro-5(5H)-benzocycloheptenyl)-o-toluic acid,
(f) α-(1,2,3,4-tetrahydro-1-naphthyl)-4-trifluoromethyl-o-toluic acid, or
(g) 4-chloro-α-(1,2,3,4-tetrahydro-1-naphthyl)-o-toluic acid.

is used in place of α-(1,2,3,4-tetrahydro-1-naphthyl)-o-toluic acid, there is obtained (a) 1,2,3,12a-tetrahydro-5-methyl-7(12H)-pleiadenone,
(b) 5-chloro-1,2,3,12a-tetrahydro-7(12H)-pleiadenone,
(c) 1,2,3,12a-tetrahydro-5-methoxy-7(12H)-pleiadenone,
(d) 1,2,3,4,13,13a-hexahydro-6-trifluoromethyl-8H-dibenzo[b,ef]heptalen-8-one,
(e) 1,2,3,4,13,13a-hexahydro-8H-dibenzo[b,ef]heptalen-8-one,
(f) 1,2,3,12a-tetrahydro-10-trifluoromethyl-7(12H)-pleiadenone, or
(g) 10-chloro-1,2,3,12a-tetrahydro-7(12H)-pleiadenone, respectively.

When the above process is carried out and in place of the o-toluic acid starting materials there is used the corresponding o-toluic acid methyl ester, the corresponding pleiadenone or heptalenone is obtained identical to the products (a) through (g) inclusive of this example.

EXAMPLE 5

1,2,3,7,12,12a-hexahydro-7-(1-methyl-4-piperidyl)-pleiaden-7-ol maleate

To a flask equipped with a stirrer, dropping funnel, condenser and gas inlet tube maintained under a nitrogen atmosphere there is added at room temperature 3.65 g. (0.15 g.-atom) of activated magnesium metal and 15 ml. of dry tetrahydrofuran. A crystal of iodine and ½ ml. of ethyl bromide are added and a vigorous evolution of hydrogen gas begins. Stirring is initiated and a solution of 20 g. (0.15 mole) of freshly distilled 4-chloro-N-methyl piperidine in 50 ml. of dry tetrahydrofuran is added at such a rate that refluxing is maintained. At the end of the addition the mixture is refluxed 1 hour longer and then cooled to an internal temperature of 5° C. A solution of 18.6 g. (0.075 mole) of 1,2,3,12a - tetrahydro - 7(12H)-pleiadenone in 25 ml. anhydrous tetrahydrofuran is added dropwise maintaining the temperature below 10° C. The resulting mixture is stirred 1 hour at room temperature and the solvent is removed in vacuo. The resulting residue is dissolved in benzene (100 ml.), cooled to 10° C. and 50 ml. of water is added dropwise with shaking. The mixture is filtered and the gelatinous precipitate is washed twice with 100 ml. benzene. The combined organic phase is washed twice with 200 ml. of 2 N hydrochloric acid. The hydrochloric acid solution is made basic with solid potassium hydroxide, extracted with methylene chloride, the methylene chloride is dried over magnesium sulfate, filtered and evaporated, and the residue is treated with an ethanolic solution of maleic acid. The resulting precipitate is filtered and recrystallized from hot ethanol to give 1,2,3,7,12,12a-hexahydro - 7 - (1-methyl - 4 - piperidyl)-pleiaden-7-ol maleate; M.P. 210–211° C. (dec.).

When the above process is carried out and (a) 1,2,3,12a-tetrahydro-5-methyl-7(12H)-pleiadenone,
(b) 5-chloro-1,2,3,12a-tetrahydro-7(12H)-pleiadenone,
(c) 1,2,3,12a-tetrahydro-5-methoxy-7(12H)-pleiadenone,
(d) 1,2,3,4,13,13a-hexahydro-6-trifluoromethyl-8H-dibenzo[b,ef]heptalen-8-one,
(e) 1,2,3,4,13,13a-hexahydro-8H-dibenzo[b,ef]heptalen-8-one,
(f) 1,2,3,12a-tetrahydro-10-trifluoromethyl-7(12H)-pleiadenone, or
(g) 10-chloro-1,2,3,12a-tetrahydro-7(12H)-pleiadenone is used in place of 1,2,3,12a - tetrahydro - 7(12H)-pleiadenone, there is obtained (a) 1,2,3,7,12,12a-hexahydro-5-methyl-7-(1-methyl-4-piperidyl)-pleiaden-7-ol maleate,
(b) 5-chloro-1,2,3,7,12,12a-hexahydro-7-(1-methyl-4-piperidyl)-pleiaden-7-ol maleate,
(c) 1,2,3,7,12,12a-hexahydro-5-methoxy-7-(1-methyl-4-piperidyl)-pleiaden-7-ol maleate,
(d) 1,2,3,4,13,13a-hexahydro-8-(1-methyl-4-piperidyl)-6-trifluoromethyl-8H-dibenzo[b,ef]heptalen-8-ol maleate,
(e) 1,2,3,4,13,13a-hexahydro-8-(1-methyl-4-piperidyl)-8H-dibenzo[b,ef]heptalen-8-ol maleate,
(f) 1,2,3,7,12,12a-hexahydro-7-(1-methyl-4-piperidyl)-10-trifluoromethyl pleiaden-7-ol maleate, or
(g) 10-chloro-1,2,3,7,12,12a-hexahydro-7-(1-methyl-4-piperidyl)-pleiaden-7-ol maleate, respectively.

EXAMPLE 6

1,2,3,7-tetrahydro-7-(1-methyl-4-piperidyl)-pleiadene

A solution of 347 mg. (0.001 mole) of 1,2,3,7,12,12a-hexahydro-7-(1-methyl-4-piperidyl)-pleiaden-7 - ol in 1.5 ml. of glacial acetic acid is cooled to 0° C. and gaseous hydrogen chloride is bubbled through the solution for 5 minutes. To the resulting solution 0.3 ml. acetic anhydride is added and the mixture is heated at reflux for 1 hour. The mixture is then poured onto crushed ice made strongly basic by the addition of solid potassium hydroxide, and extracted twice with 30 ml. benzene. The benzene is washed twice with 15 ml. of water, dried over magnesium sulfate and evaporated in vacuo. The residue is recrystallized from hot petroleum ether to give 1,2,3,7-tetrahydro-7-(1-methyl - 4 - piperidyl) - pleiadene; M.P. 115–117° C.

When the above procedure is carried out and in place of 1,2,3,7,12,12a-hexahydro-7-[1-methyl - 4 - piperidyl]-pleiaden-7-ol (prepared from the maleate by treatment of the salt in water with 2 N sodium hydroxide) there is used (a) 1,2,3,7,12,12a-hexahydro-5-methyl-7-(1-methyl-4-piperidyl)-pleiaden-7-ol,
(b) 5-chloro-1,2,3,7,12,12a-hexahydro-7-(1-methyl-4-piperidyl)-pleiaden-7-ol,
(c) 1,2,3,7,12,12a-hexahydro-5-methoxy-7-(1-methyl-4-piperidyl)-pleiaden-7-ol,
(d) 1,2,3,4,13,13a-hexahydro-8-(1-methyl-4-piperidyl-6-trifluoromethyl-8H-dibenzo[b,ef]heptalen-8-ol,
(e) 1,2,3,4,13,13a-hexahydro-8-(1-methyl-4-piperidyl)-8H-dibenzo[b,ef]heptalen-8-ol,
(f) 1,2,3,7,12,12a-hexahydro-7-(1-methyl-4-piperidyl)-10-trifluoromethyl pleiaden-7-ol, or
(g) 10-chloro-1,2,3,7,12,12a-hexahydro-7-(1-methyl-4-piperidyl)-pleiaden-7-ol, there is obtained (a) 1,2,3,7-tetrahydro-5-methyl-7-(1-methyl-4-piperidyl)-pleiadene,
(b) 5-chloro-1,2,3,7-tetrahydro-7-(1-methyl-4-piperidyl)-pleiadene,
(c) 1,2,3,7-tetrahydro-5-methoxy-7-(1-methyl-4-piperidyl)-pleiadene,
(d) 1,2,3,4-tetrahydro-8-(1-methyl-4-piperidyl)-6-trifluoromethyl-8H-dibenzo[b,ef]heptalene,
(e) 1,2,3,4-tetrahydro-8-(1-methyl-4-piperidyl)-8H-dibenzo[b,ef]heptalene,
(f) 1,2,3,7-tetrahydro-7-(1-methyl-4-piperidyl)-10-trifluoromethyl pleiadene, or
(g) 10-chloro-1,2,3,7-tetrahydro-7-(1-methyl-4-piperidyl)-pleiadene, respectively.

What is claimed is:

1. A compound of the formula

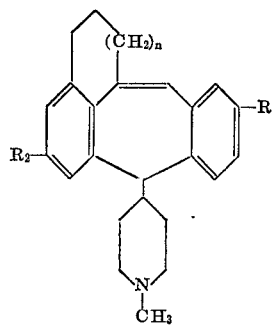

wherein $n$ represents 1 or 2;
$R_1$ represents H, halo having an atomic weight of 19–36, or trifluoromethyl; and
$R_2$ represents H, halo having an atomic weight of 19–36, trifluoromethyl, straight chain loweralkyl, or straight chain loweralkoxy;

or a pharmaceutically acceptable acid addition salt thereof.

2. The compound of claim 1 which is 1,2,3,7-tetrahydro-7-(1-methyl-4-piperidyl)-pleiadene.

3. A compound of the formula

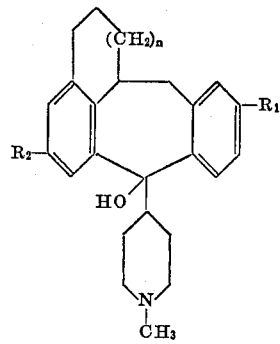

wherein $R_1$, $R_2$ and $n$ are as defined in claim 1;

or a pharmaceutically acceptable acid addition salt thereof.

4. The compound of claim 3 which is 1,2,3,7,12,12a-hexahydro-7-(1-methyl-4-piperidyl)-pleiaden-7-ol maleate.

5. A process for preparing a compound of claim 1, which comprises condensing a compound of the formula

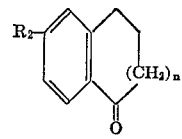

with a compound of the formula

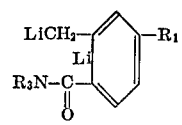

to obtain a compound of formula

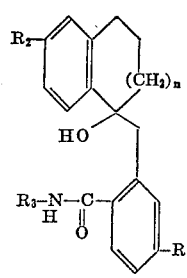

treating the latter with strong base to obtain intermediate compounds of the formulas

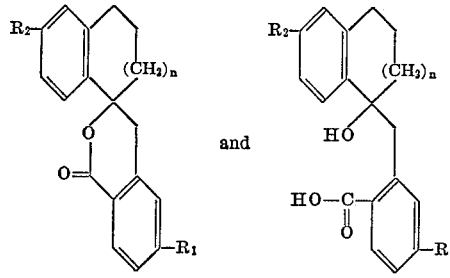

reducing the intermediate compounds to obtain an acid of the formula

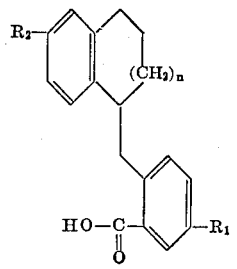

treating the latter or a loweralkyl ester thereof with strong mineral acid, or treating the acid halide of said acid first with a Friedel-Crafts type catalyst and hydrolyzing the resulting product to obtain a ketone of the formula

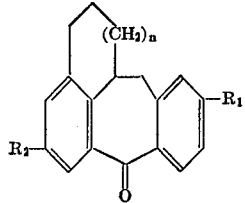

treating the ketone with a Grignard reagent of a compound of the formula

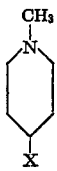

and hydrolyzing the resulting adduct to obtain a compound of the formula

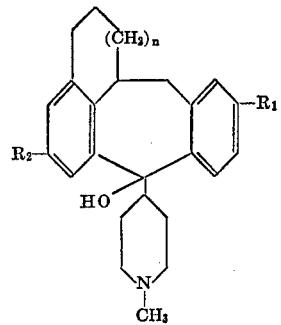

and dehydrating the latter, where $R_1$, $R_2$, $R_3$, and $n$ are as defined in claim 1, and X is halo of an atomic weight of 35–80.

References Cited
UNITED STATES PATENTS 3,476,761   11/1969   Fouché _____ 260—293.4
3,530,183   9/1970    Kyburz et al. _____ 260—562
3,557,098   1/1971    Kaiser et al. _____ 260—240

HENRY R. JILES, Primary Examiner
G. T. TODD, Assistant Examiner